No. 744,907. PATENTED NOV. 24, 1903.
P. DAHLE.
HOUSE MOVING TRUCK.
APPLICATION FILED JULY 18, 1903.
NO MODEL.

Witnesses
M. E. Corder
Geo. E. Tew

Inventor
Philip Dahle
by Milo B. Stevens & Co
Attorneys

No. 744,907. Patented November 24, 1903.

UNITED STATES PATENT OFFICE.

PHILIP DAHLE, OF EUREKA, CALIFORNIA.

HOUSE-MOVING TRUCK.

SPECIFICATION forming part of Letters Patent No. 744,907, dated November 24, 1903.

Application filed July 18, 1903. Serial No. 166,080. (No model.)

*To all whom it may concern:*

Be it known that I, PHILIP DAHLE, a citizen of the United States, residing at Eureka, in the county of Humboldt and State of California, have invented new and useful Improvements in House-Moving Trucks, of which the following is a specification.

This invention relates to house-moving trucks, and particularly to the means for guiding a set of trucks when in use.

The object of the invention is to produce an improved draft arrangement whereby the trucks will be self-regulating.

A further object is to provide means for effecting an easy turn of a truck having a series of rollers.

The invention is illustrated in the accompanying drawings, in which—

Figure 1:
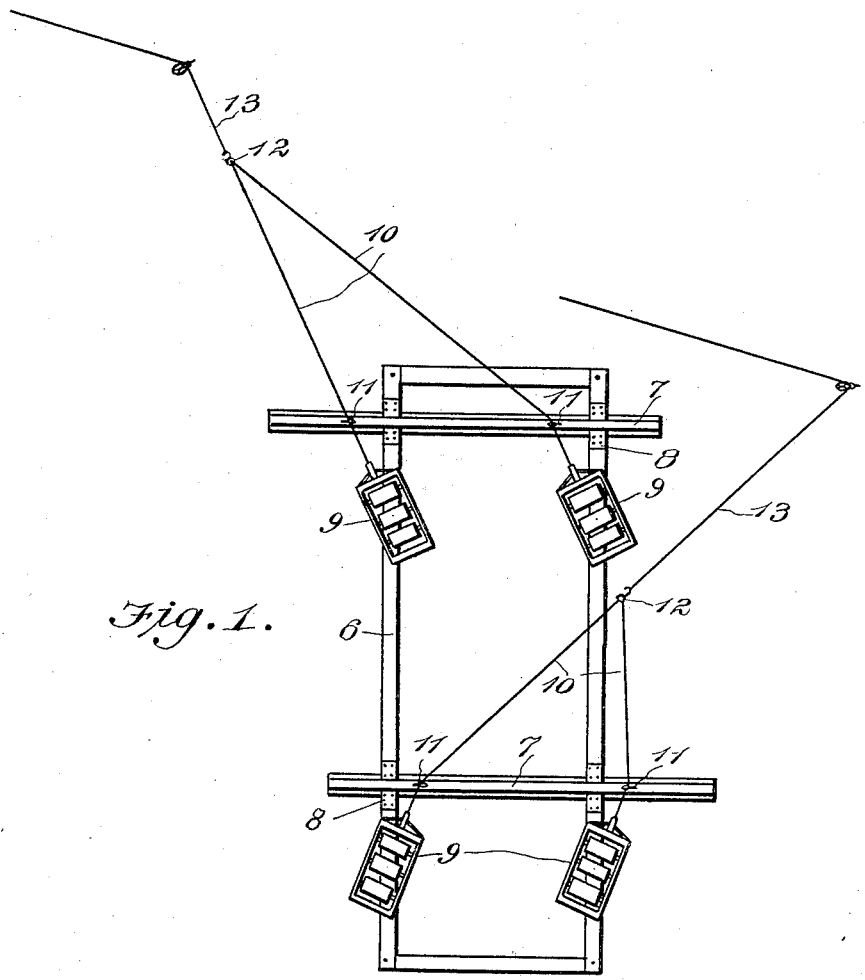
Figure 2:
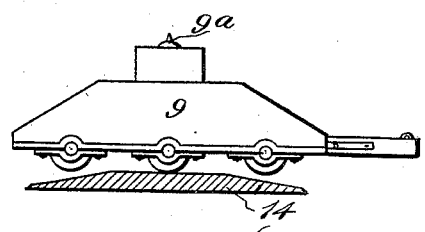
Figure 3:
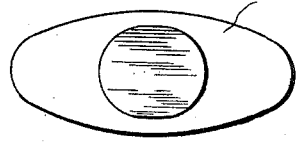

Figure 1 is an inverted plan view of the apparatus. Fig. 2 is a side elevation of one of the trucks on a turn-table, the latter being shown in section; and Fig. 3 is a top plan view of the turn-table.

Referring specifically to the drawings, 6 indicates the beams forming the frame upon which the building is carried. Upon the under side of this frame are the guiding or regulating beams 7. These are slidable laterally on the frame, being held thereto by clips 8 engaging under flanges on the beam. The trucks are indicated at 9, two pairs being shown, each pair being behind one of the movable or regulating beams. Each truck is connected to its mate by a draft-rope 10, which extends from the trucks through blocks 11, attached to the beam, and through a block 12, connected to the draft-rope 13. The side beams of the frame 6 rest on pivots 9ª on the trucks, and the blocks 11 are the same distance apart as the distance between the pivots of the pair of trucks.

The trucks preferably have three rollers, as shown, which may have ball-bearing journals, and to turn the truck without binding I use a turn-table 14, having a low frusto-conical shape, so that when the truck is run up on the turn-table only the middle roller touches, and the truck may be turned thereon as a pivot. This is particularly useful on soft ground.

When proceeding straight ahead, the sliding beam 7 is in middle position, and the rope 10 keeps the trucks directed straight ahead. When it is desired to turn, turn-tables are put in front of the trucks, which are then run upon the tables. Then by sliding the beam 7 sidewise to the proper extent the direction of travel of the trucks will be changed; but the trucks will be retained in parallelism and proper direction and binding or cramping prevented.

What I claim as new, and desire to secure by Letters Patent, is—

1. In a house-moving apparatus, the combination of a frame, a pair of trucks pivoted side by side thereunder, a laterally-sliding beam extending across the frame before the trucks, and having blocks the same distance apart as the truck-pivots, and a draft-rope connected to both trucks and rove through the blocks.

2. In a house-moving apparatus, the combination with a pair of trucks standing side by side, a draft-rope connected to both trucks, a laterally-slidable beam in front of the trucks, having blocks the same distance apart as the trucks, through which the draft-rope is rove, and a draft-block on the rope between said blocks.

In testimony whereof I have signed my name to this specification in the presence of two subscribing witnesses.

PHILIP DAHLE.

Witnesses:
ABRAHAM B. MARKLE,
FRANK E. HERRICK.